FIG IA 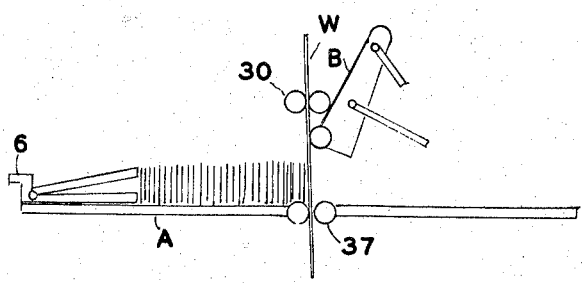
FIG IB 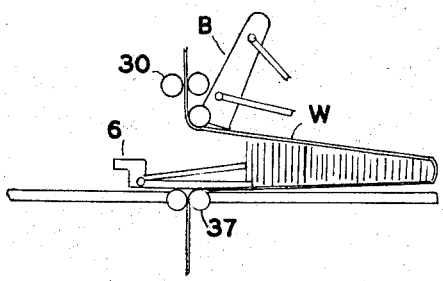
FIG IC 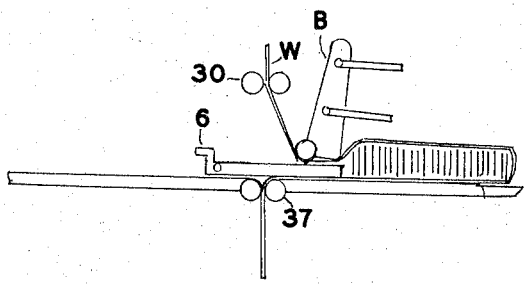
FIG ID 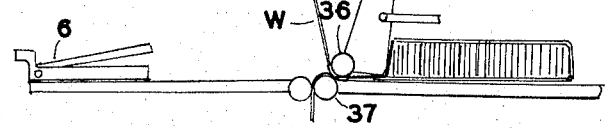
FIG IE 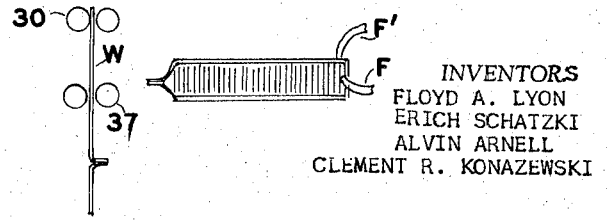
INVENTORS
FLOYD A. LYON
ERICH SCHATZKI
ALVIN ARNELL
CLEMENT R. KONAZEWSKI

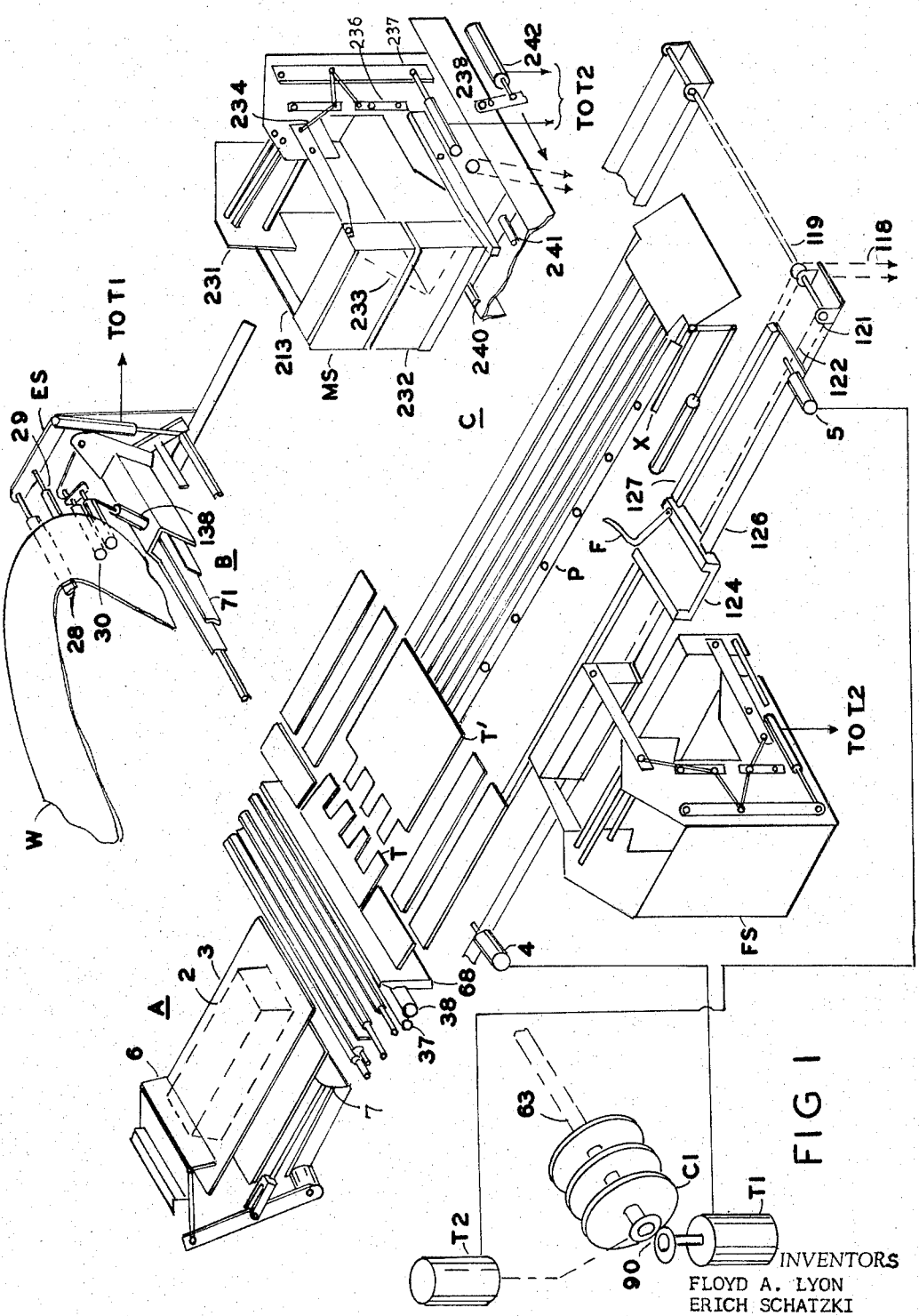

INVENTORS
FLOYD A. LYON
ERICH SCHATZKI
ALVIN ARNELL
CLEMENT R. KONAZEWSKI

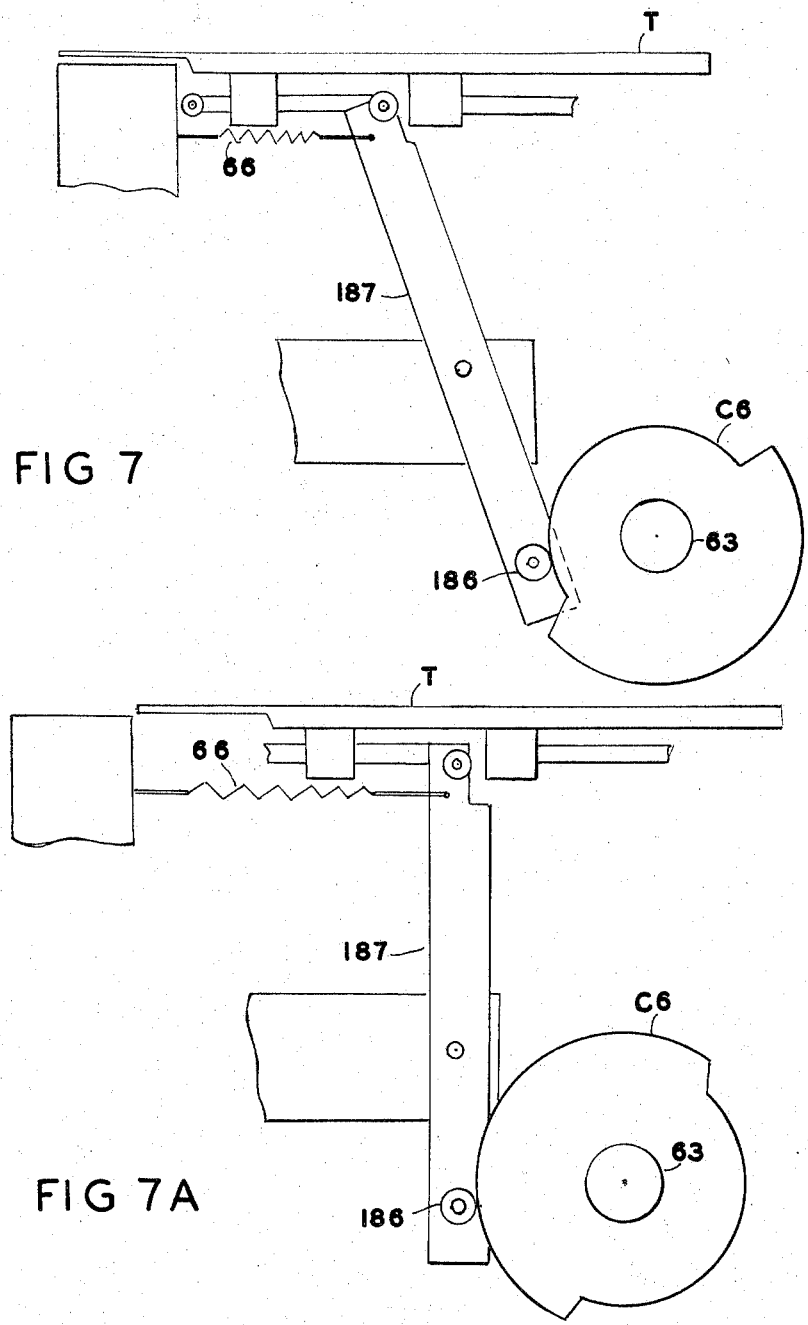

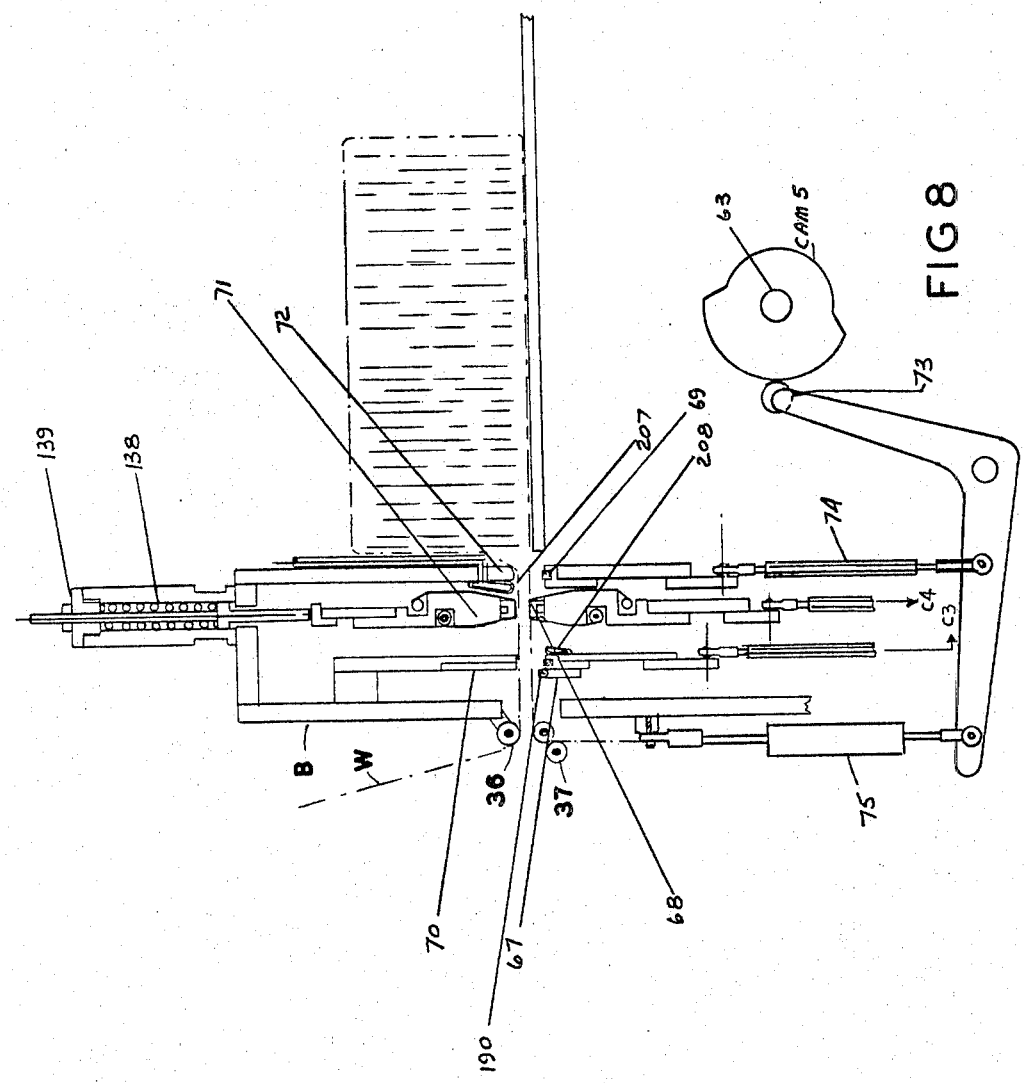

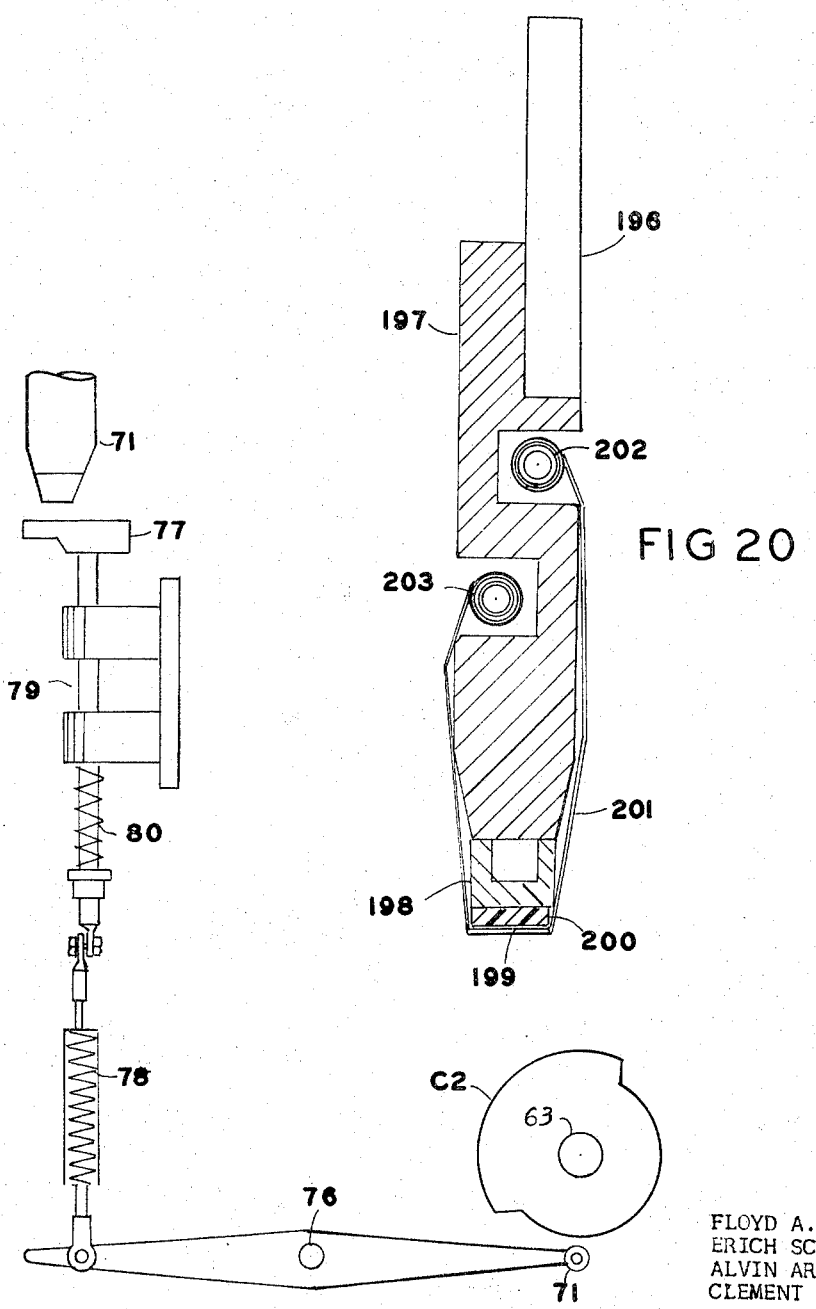

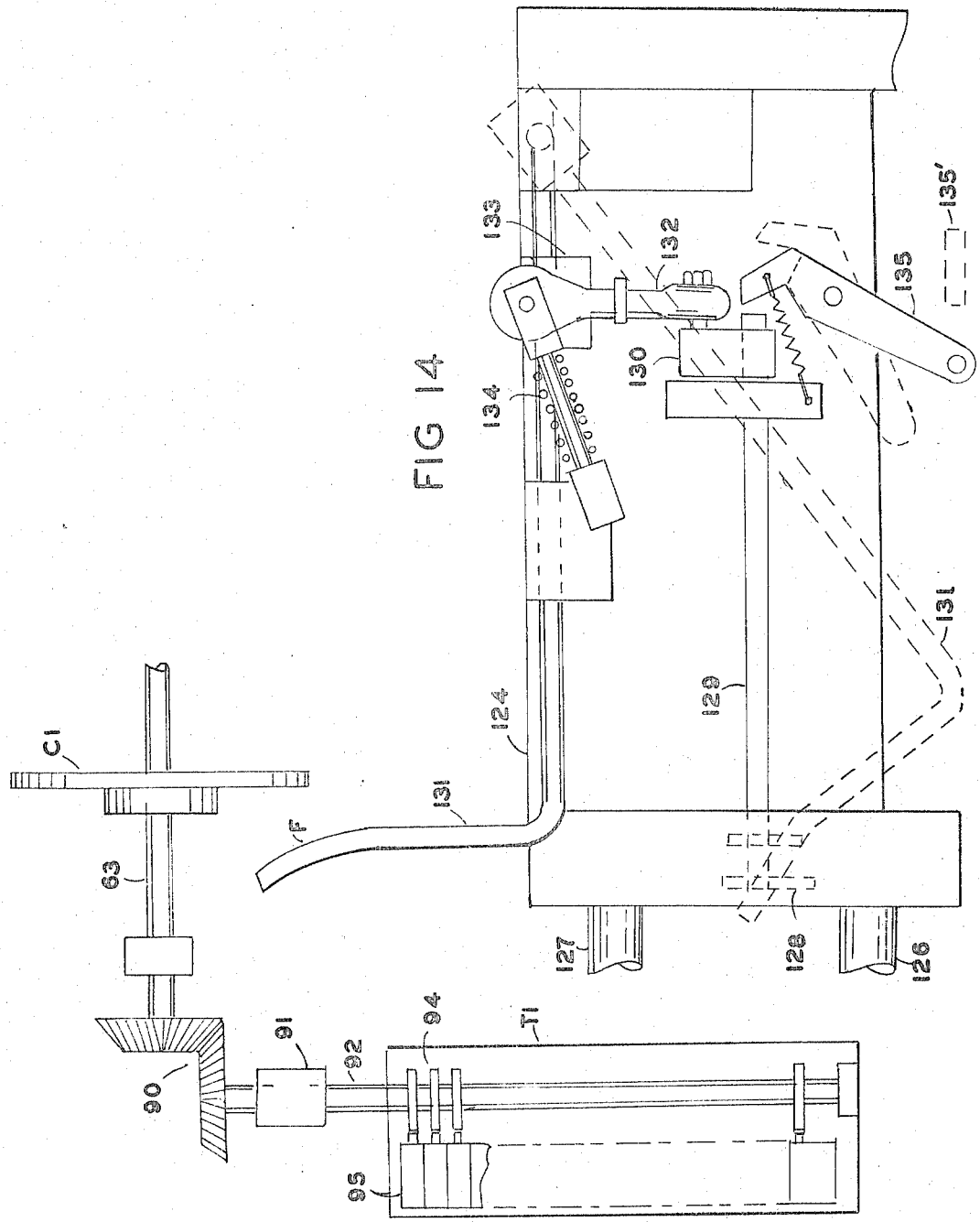

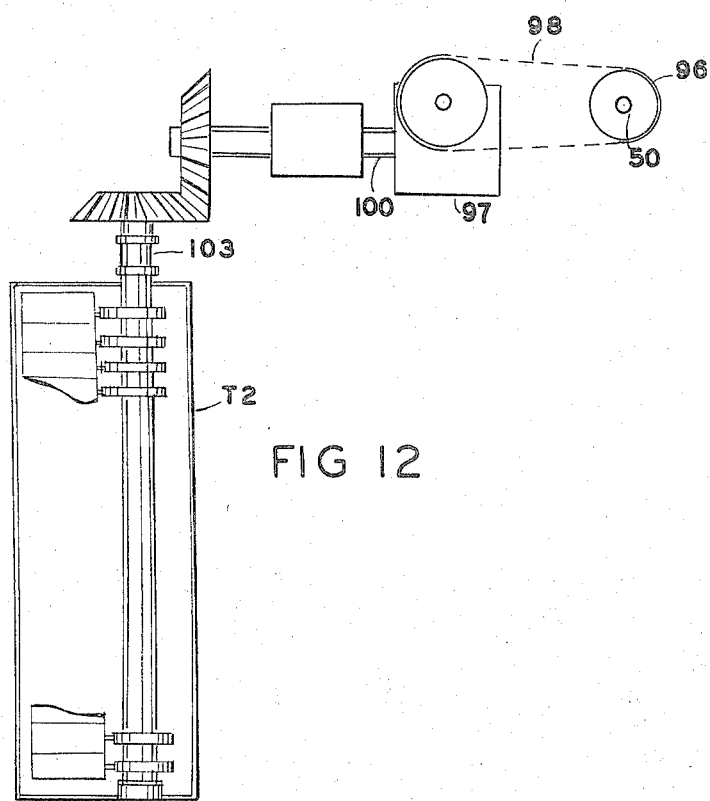

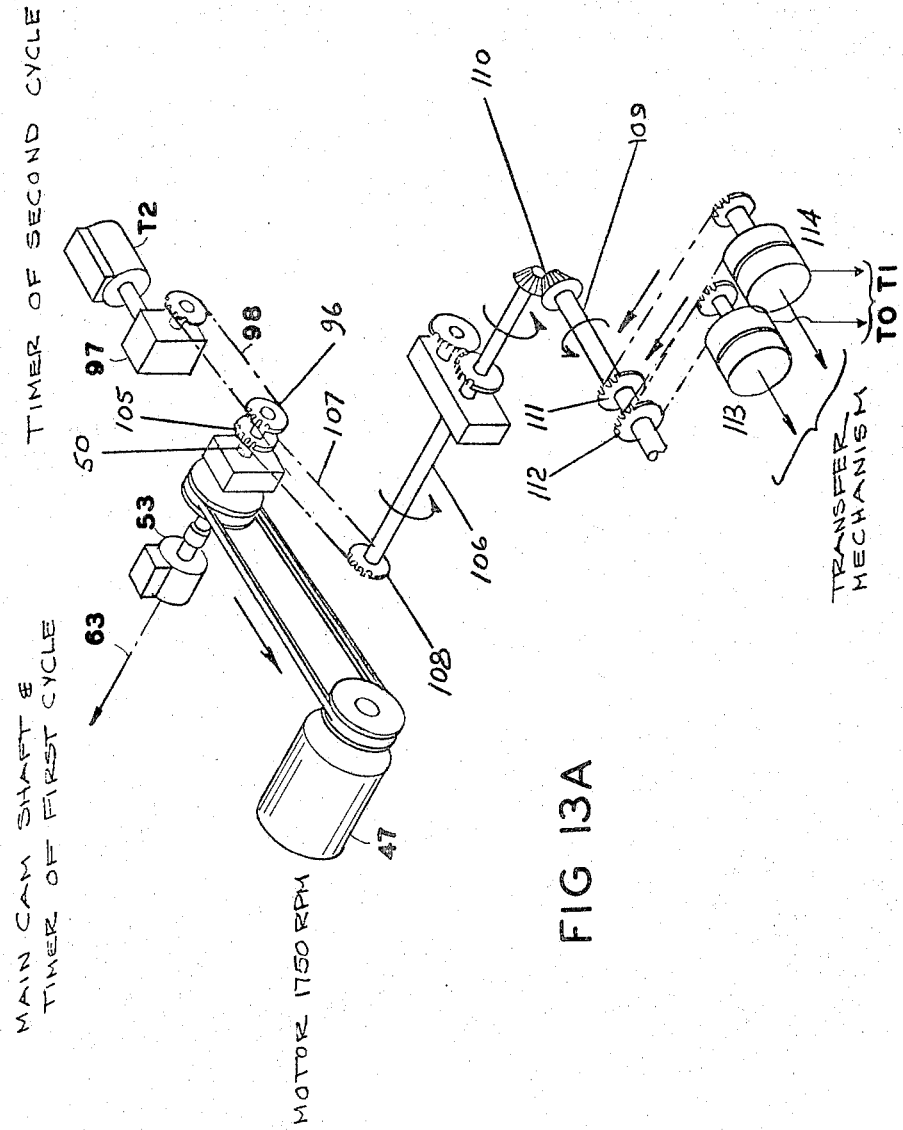

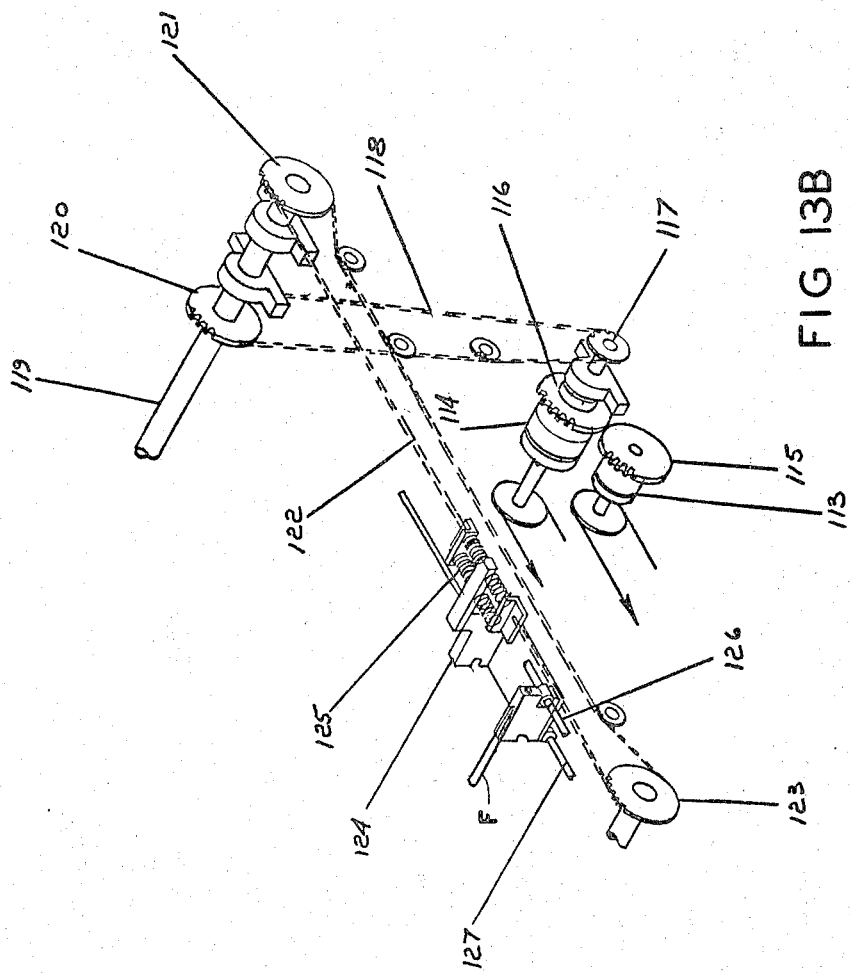

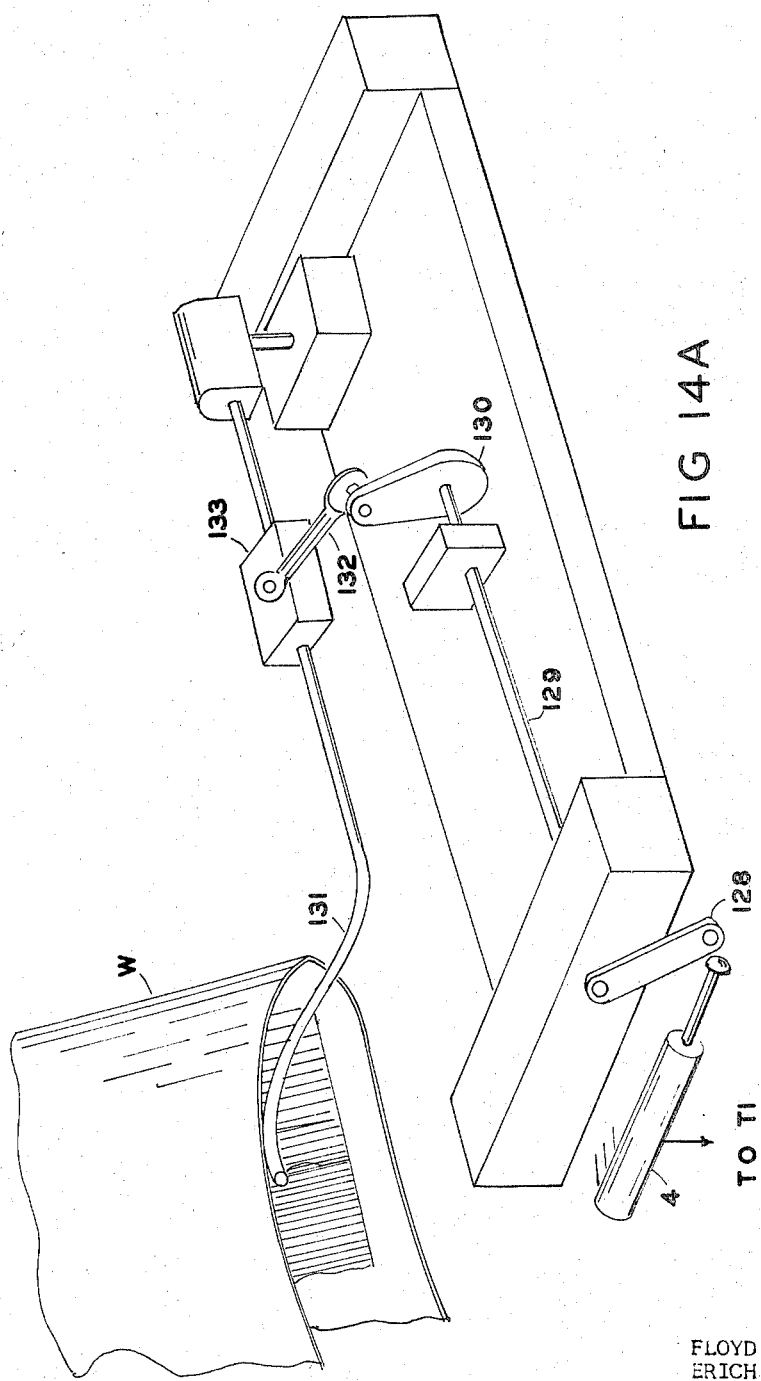

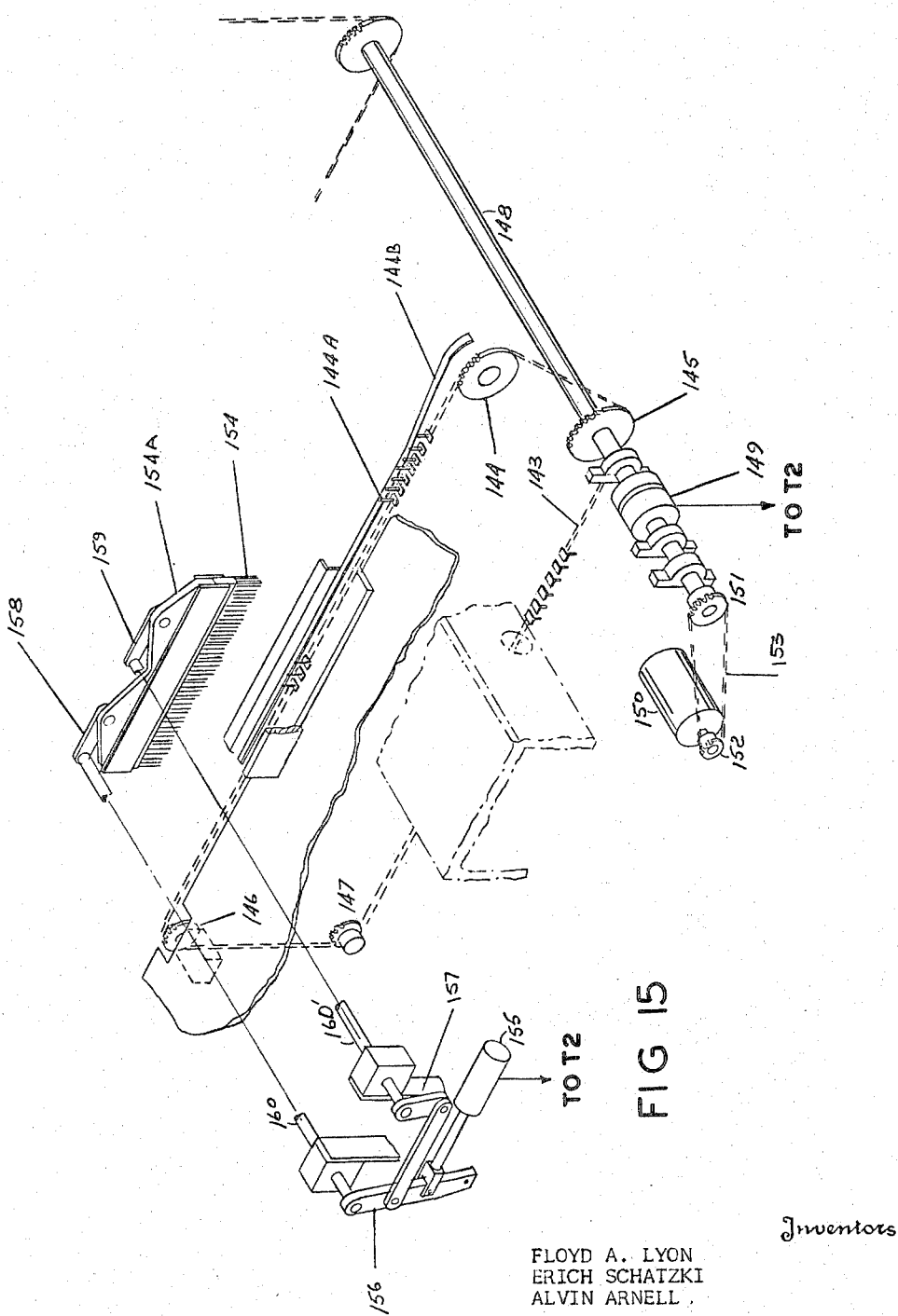

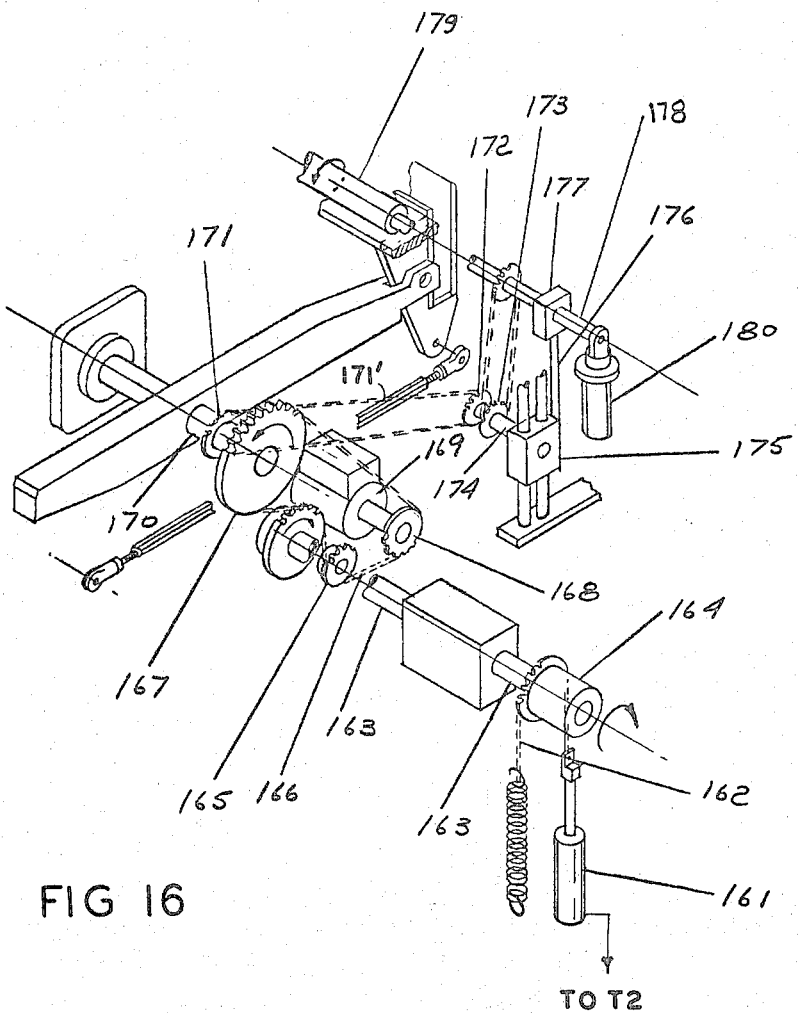

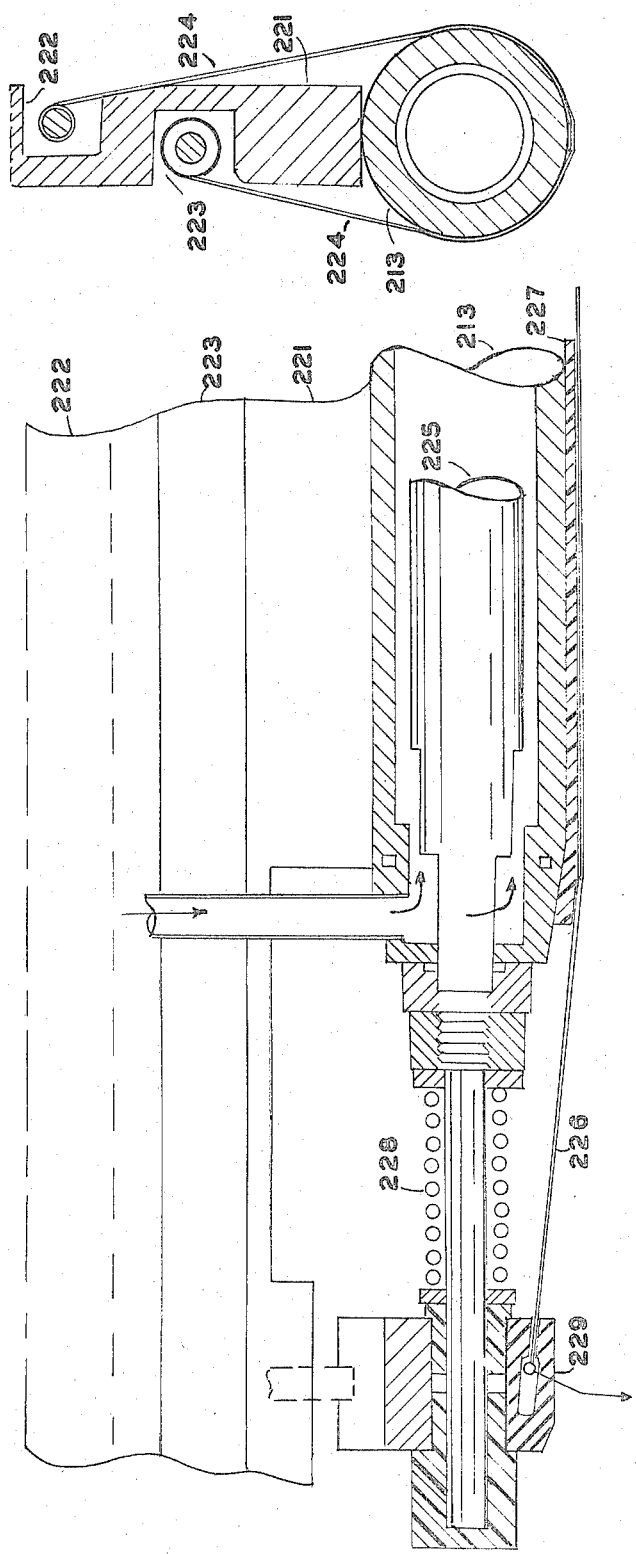

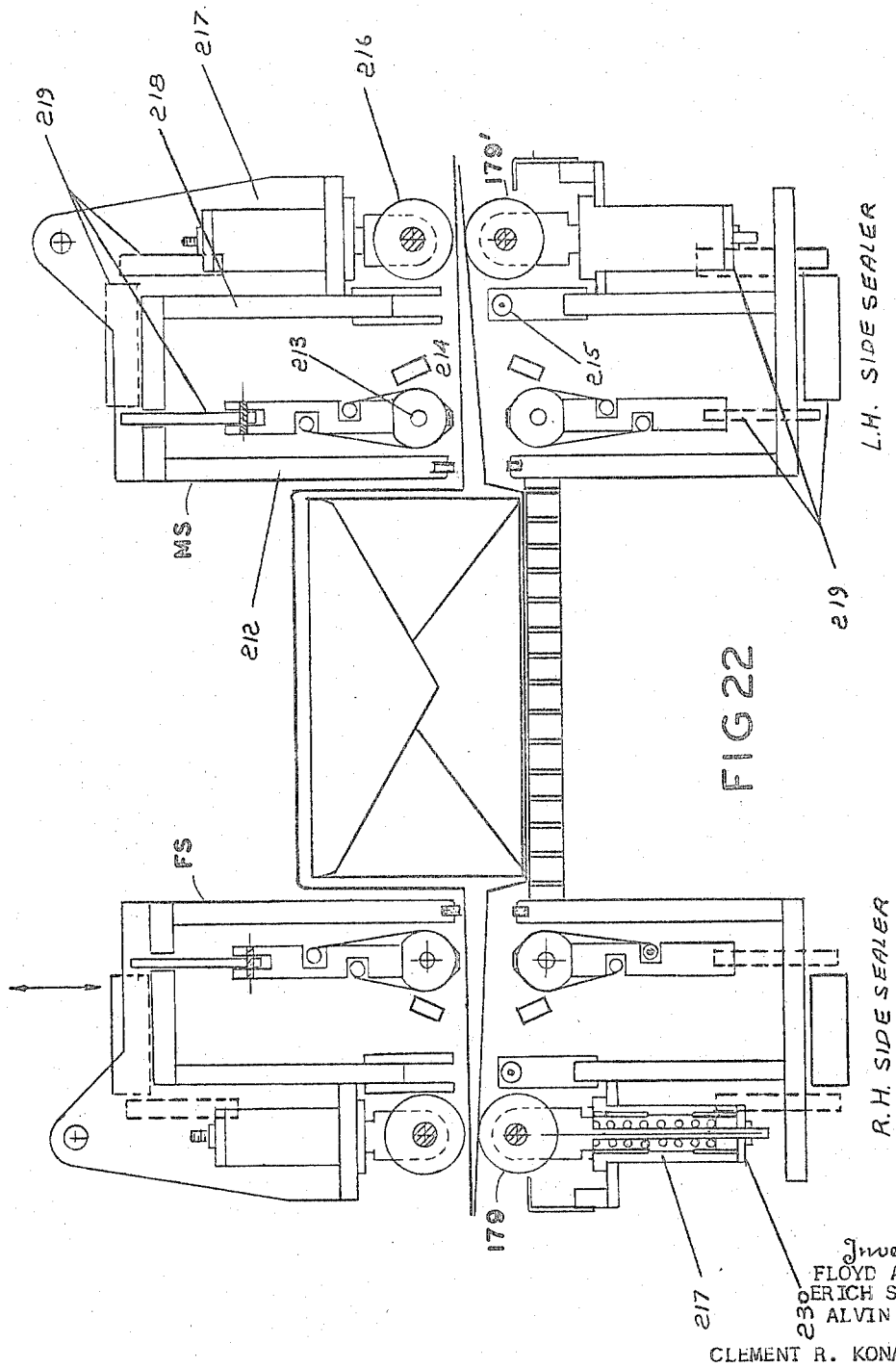

United States Patent Office 3,377,772
Patented Apr. 16, 1968

3,377,772
AUTOMATIC WRAPPING MEANS
Floyd A. Lyon, Brookville, Erich Schatzki, New York, Alvin Arnell, Brooklyn, and Clement R. Konazewski, Glen Cove, N.Y., assignors to Halm Instrument Co., Inc., Glen Head, N.Y.
Filed June 14, 1965, Ser. No. 463,662
9 Claims. (Cl. 53—229)

ABSTRACT OF THE DISCLOSURE

Means to automatically wrap bundles and articles comprising a bundle receiving platform, means to feed and clamp a web of heat sealable plastic at a first work location, means to clamp said web in a vertical plane, means to push said bundle against said web completely past said vertical plane of said web thereby wrapping said material in a loop around said bundle, means to heat seal the ends of said loop, and means to cut said loop from said web and reseal said web, means to advance said web and clamp it at a point after said seal reuniting said web so that the web is ready for another bundle, means to move said partially heat sealed bundle onto a collapsible table at a second work location, first fixed heat sealing means at said second work location, second motor driven movable side sealing means at said second work location.

This invention relates to automatic wrapping means and more particularly to means for automatically wrapping bundles such as envelopes, papers or other articles.

More specifically the invention provides means for wrapping bundles of envelopes, paper or other articles of variable sizes.

The present invention provides means to wrap bundles and articles comprising a bundle receiving platform and means to feed and clamp a web of heat sealable plastic at a first work location, means to clamp said web in a vertical plane, means to push said bundle against said web completely past said vertical plane of said web thereby wrapping said material in a loop around said bundle, means to heat seal the ends of said loop, and means to cut said loop from said web and reseal said web, means to advance said web and clamp it at a point after said seal reuniting said web so that the web is ready for another bundle, means to move said partially heat sealed bundle onto a collapsible table at a second work location, first fixed heat sealing means at said second work location and second movable side sealing means at said second work location.

The movable sides sealing means are adapted to move and squeeze the sides of the bundles between the stationary side sealing means and the movable side sealing means. Then the movable side sealing moving means seals one side and the stationary sealing means seals the other side. Means are provided to trim and remove any excess material from the side seals, and to eject the bundle. A collapsible table is provided between the two side sealing means so that very small bundles may be accommodated. Printing means may also be provided to print identification information on the web.

Accordingly, a principal object of the invention is to provide new and improved automatic wrapping means.

Another object of the invention is to provide new and improved automatic wrapping means for bundles, envelopes, papers or other articles.

Another object of the invention is to provide new and improved wrapping means for variable size bundles, envelopes, papers, or other articles of variable sizes including moving heat sealing means and collapsible platform means.

Another object of the invention is to provide new and improved heat sealing means.

Another object of the invention is to provide new and improved heat sealing means which are movable to accommodate various sizes of bundles or articles.

Another object of the invention is to provide new and improved bundle wrapping means comprising, means to feed a web of heat sealable wrapping material, a bundle receiving platform, means to feed and clamp said web in a first plane at a first work location, means to push said bundle along an axis perpendicular to said plane against said web and completely past said first plane to form a loop of said wrapping material around said bundle, means to heat seal the ends of said loop, means to cut said loop from said web and reseal said web, means to take up said web in a forward direction and clamp said web after the point where it has been resealed, a table collapsible in a one plane at a second work location, means to move said end sealed bundle along said axis onto said table, first stationary side heat sealing means at said second work location, second side sealing means at said second work location, said second side sealing means being adapted to move perpendicular to said axis to collapse said table to permit snug side sealing of said bundle, and means to eject said bundle from said second work location.

These and other objects of the invention will be apparent from the following specification and drawings of which:

FIGURE 1 is a perspective exploded view of an embodiment of the invention.

FIGURES 1A through 1E are diagrams illustrative of the invention.

FIGURES 7 and 7A are diagrams illustrating the operation of the sliding table.

FIGURE 8 is a schematic side view of the end sealer.

FIGURE 9 is a schematic diagram illustrating the lifting of the upper end sealer.

FIGURE 11 is a side view of the first cycle timer.

FIGURE 12 is a side view of the second cycle timer.

FIGURE 13A is a perspective view of the lower transfer drive.

FIGURE 13B is a perspective view of the upper transfer drive.

FIGURE 14 is a plan view of a finger carriage.

FIGURE 14A is a perspective view of a finger carriage.

FIGURE 15 is a perspective view of the excess material trimmer and remover.

FIGURE 16 is a diagram of the right side sealer drive.

FIGURE 18 is a detail view of the sealing means.

FIGURE 20 is a side view of the sealer bar and the end sealer.

FIGURE 22 is a schematic diagram of the side sealers.

FIGURE 23 is a detail view of the sealing means.

General operation

Figure 2:
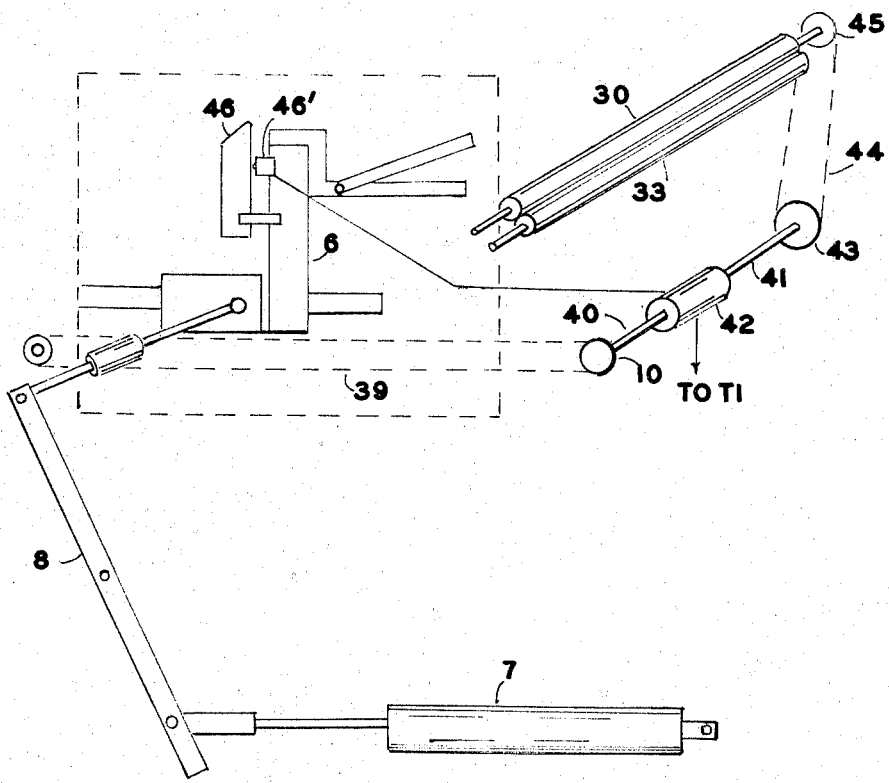
FIGURE 2 is a perspective view of the pushing and loading mechanism.

Referring to FIGURE 1, the load of envelopes is placed on the tray 3 and the film web W is fed over roller 30, down through the snubbing rollers 37 so that it forms a vertical curtain. The load of envelopes is then pushed through the curtain onto the table T, T'.

The end sealer B then comes down and seals the loop of the web around the load and also cuts and rejoins the web.

The load is then moved by side fingers F, F' on movable carriages to a position between side seal members MS and FS. If desired, one of the side sealers MS may be movable in and out and the table made collapsible to accommodate this movement.

The side sealers then clamp and seal the sides of the web W around the load and at the same time cut off any excess material. The wrapped and sealed load is then ejected at the other end of the machine.

Summary of operations

Platform A is preloaded.

Push start button 53' on control means.

This actuates clutch 53 and starts main cam shaft 63 and first cycle timer T1.

The timer T1 actuates air cylinder 7 and pushes pusher 6 forward.

The film is simultaneously fed by roller 30 as follows:

Pusher 6 moves chain 39 to drive the clutch brake 42 which drives roller 30. Dancer arm 31 activates microswitch 32 and energizes motor 15, to drive film.

Cam C6 changes the position of the sliding table, to cover the lower end sealer while the load is pushed over it.

Cam C1 moves the end sealer down.

Cutting wire 190 cuts and rejoins the web. The package is then heat sealed by end sealer and end sealer is raised by cam C1.

The moving fingers F, F' are inserted in the open loop of the end sealed web by cylinder 4 which are actuated by the first cycle timer T1. The first cycle timer activates clutch 113 moving the chain 122 and finger carriage to the side sealer position. The carriages are reversed by air cylinder 5 which is controlled by the timer T2.

General control means

Control of all the elements is provided by cams C1–C6 on main cam shaft 63 which also operates two timers, a first cycle timer which controls the end sealer operation and a second cycle timer which operates the side sealer operation.

More particularly, a number of microswitches are on each timer shaft and the microswitches control solenoid operated pneumatic cylinders which are connected to various specific elements.

Cam operation

Cams C1, C1' operate the upper end sealer.

Cams C2, C2' lift the upper heat sealer ribbon holder 71 (FIGURE 9).

Figure 4:
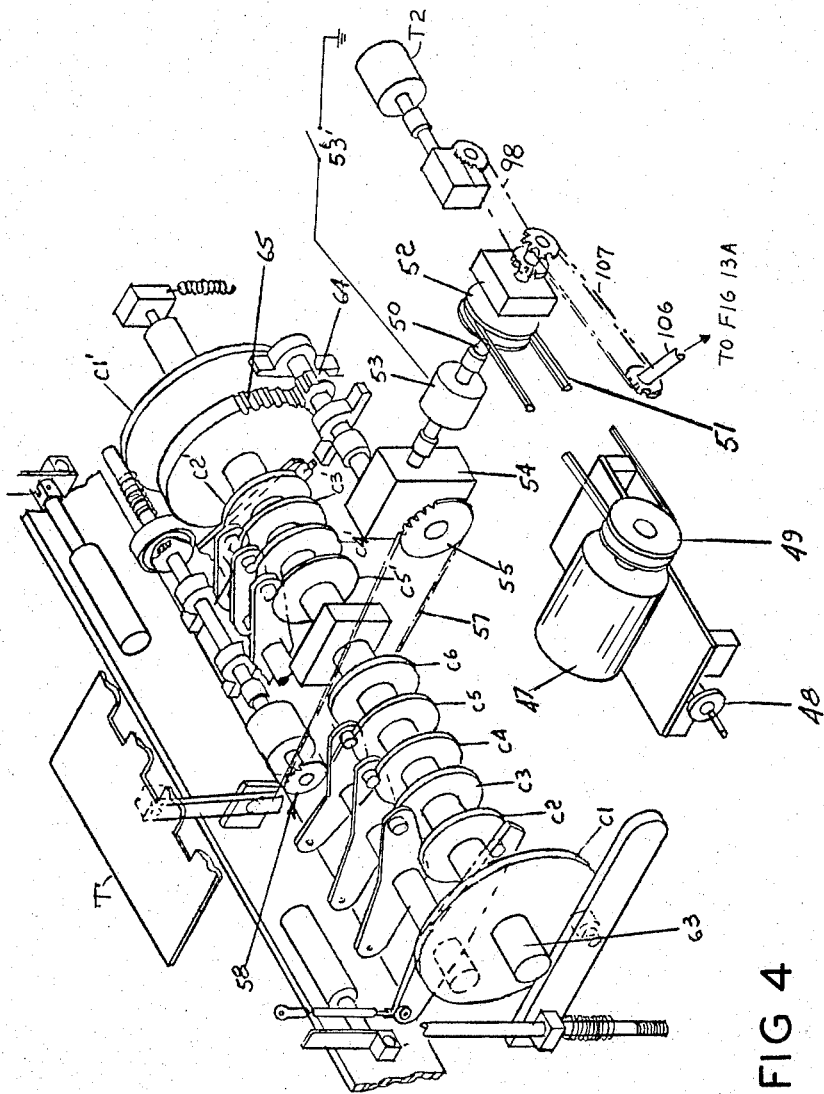
FIGURE 4 is a perspective view of the control cam mechanism.

Cams C3, C3', C4, C4', C5, C5' operate elements of lower end sealer (FIGURE 4).

Cams C3, C3' operate the cutter wire 190.

Cams C4, C4' operate lower heat sealer ribbon holder.

Cams C5, C5' operate the lower clamp 69.

Cam C6 operates the sliding table T (FIGURE 7).

Side sealer operation

There are two side sealers MS and FS. If desired, one is fixed and the other moves in and out. In order to accommodate the moving sealer, the table P is collapsible. The side sealers are generally similar to the end sealer and in addition have snubbing rollers which take up the excess film material. Each side sealer has a cutting wire which severs the excess film. The snubbing rollers then move the excess material to a removal chain and the excess material is pushed down on sharp pins or spikes mounted on the chain. The excess material is pushed into sharp pins on the chain by means of steel wire brushes which push down the excess material and spikes it onto the chain. The chain then removes the excess material.

The present invention provides a method for automatically overwrapping random size letter mail in plastic film.

General description

In the embodiment shown, the machine's function is to package for instance, random size letter mail or articles in variable sizes from 2¾" to 5⅞" in width; 4" to 12" in length. The quantity of letters in one package may vary in stack length from 4" to 24".

Referring to FIGURES 1 and 1A–1E the basic machine operates as follows:

(A) A load of mail is placed onto the loading mechanism A by the operator, FIGURE 1A. The plastic web W is clamped by the lower rollers.

(B) Upon actuation of the machine, FIGURE 1B, the feed pusher 6 starts the mail moving forward past the end sealer B.

(C) Simultaneously with this operation, the plastic web material W is fed into the machine by the upper rollers, wrapping the stack of mail on three sides (bottom, front and top). At the same time the overwrap material is fed, a tear strip material may be fed inside the package. Also, simultaneously with material feed, the destination may be imprinted on the plastic film.

(D) Upon completion of its final stroke, FIGURE 1C, the pusher 6 stops, the end sealer B is actuated, and the sealer head partially closes retaining the mail in position and allowing the feed pusher to retract ready for the feeding of the next stack of letters.

(E) The sealer head is allowed to close completely and the heat sealers are fired, a hot cut off wire cuts the completed package from the feed web and leaves the web ready for the next stack, FIGURE 1E. This completes the first overwrap operation.

(F) When the mail is completely fed forward and just before the end seal is completed, carrier fingers F, F', enter the lead edge flaps of the package. When the end seal is completed and the package severed from the feed web, the fingers are actuated and they transfer the overwrapped stack to the side seal station C, FIGURE 1.

(G) When the package reaches the side seal station C, the fingers F, F' retract and the movable side sealer MS starts its travel towards the package and the fixed side sealer FS. At this point the jaws of the side sealers are open and the extended flaps of plastic film are placed between snubber rollers.

(H) When the movable side sealer's travel is restricted by the mail, the side sealers partially close and the snubber rollers grab the flaps of material. Just prior to final closure of the side sealer jaws, the snubbers are actuated, drawing the material of the flaps taut.

(I) The side sealer jaws close and the side sealers are fired. Simultaneously with the firing of the side sealers, the waste-cut-off wire is actuated and the waste material of the side flaps is cut off.

(J) The waste material is transported sideways to waste material take-away pin chain and the waste cut-off is affixed to the chain. The pin chain then carries the waste material to the delivery end of the machine.

(K) Upon completion of the package, the throw-out delivery table X is actuated, delivering the package to the end of the machine.

Detailed description and operation

The load for instance, of envelopes is stacked on table A. The rear edge of the letter stack leans against pusher 6, FIGURE 2, and its front edge leans against a vertical sheet of packaging film W. This vertical sheet of material is held in place by lower snub rollers 37, and the material required to form the package is fed into the machine as shown in FIGURE 3.

The pusher 6, FIGURE 2, is actuated by the pneumatic cylinder 7 by means of lever 8. The pusher rides on the chain 39 which is also connected via the sprockets 10 and 43, chain 44, sprocket 45 to the upper web rollers 30 and 33. The sprockets 10 and 43 are connected by the shaft 41 preferably through the clutch brake 42.

Feeding packaging material

Figure 3:
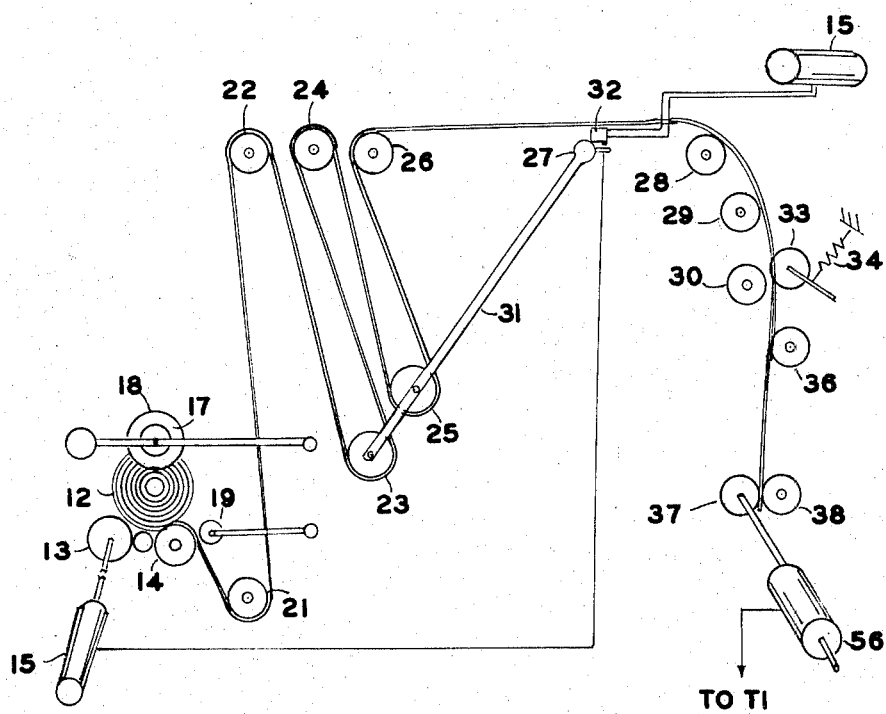
FIGURE 3 is a diagram illustrating the package feeding mechanism.

Referring to FIGURE 3, the operator places the roll 12 of the packaging material film upon rubber rollers 13 and 14. These rollers are driven by motor 15, FIGURE 6, through speed reducer 136, gears 136', chain 142 and sprockets 140 and 141.

The film W is fed between rollers 14 and 19. Roller 17 which is held above and away from film roll 12, while it is being loaded, then lowered to rest on roll 12, and tracking collars 18 of roller 17 confine the roll side-to-side preventing mistracking.

The film is then fed over rollers 21–30 which are located on the frame of the machine, with the exception of rollers 23 and 25 which are located on dancer arm 31 which pivots on shaft of roller 27.

The roller and dancer arm system, rollers 22 and 27 and dancer arm 31, allow for extremely rapid feeding described later.

The film is then fed over rollers 28 and 29 and through rollers 30 and 33, these rollers being located on the frame of the machine. Roller 33 is normally pressed against roller 30 by means of spring 34, providing a sufficient gap for the feeding of the material through rollers 33 and 30. The rollers must be engaged during normal operation of the machine.

The film is then fed past roller 36 which is located on the end sealer and then down between snub rollers 37 and 38. Optional tear strip material is fed exactly the same as the packaging material. The film is in position and the machine is ready for operation.

Final loading procedure

The operator moves the loaded stack of letters against the curtain W of packaging film which is now formed between the upper portion of the end sealer 36 and held between rollers 37 and 38. As the operator pushes the letter stack forward, he must cause a slight bulge in the curtain—in effect, preliminary feed of a small portion of film at the same time slightly lifting the leading letters so that the face of the letters tilt slightly upwards. In order to move pusher assembly 6 forward, the operator pushes lever 46, FIGURE 2, actuating microswitch 46' which disengages clutch 42, allowing the pusher to be manually pushed forward. The moving of pusher 6 forward, causes preliminary compression of the stack and allows the operator to compensate for stacks shorter than 24 inches in length. This must be done for accurate, automatic feeding of letter mail.

Automatic operation of the machine

To start the automatic operation of the machine, the operator pushes the switch 53', FIGURE 4.

This actuates clutch 53 between the main motor 47 and the main cam shaft 63, FIGURE 4. The cam shaft 63 begins to turn and with it the shaft of the first timer T1 FIGURE 11.

The timer switch actuates air cylinder 7, FIGURE 2, starting the pusher 6 moving forward. Pusher 6 moves the letters until they come to rest, FIGURE 1B. The high speed infeed of the film and letter mail may cause a slight overfeeding of the packaging material, allowing the letter stack to fall forward when it comes to rest. This condition is rectified as soon as the sealer head comes down, snubbing the material, FIGURE 1C. The upper sealer travels down until pusher 6 has been completely collapsed, then pusher 6 is retracted, FIGURE 1D, the upper sealer continues its travel down until roller 36 touches roller 37. The sealer is actuated by cam C1, FIGURE 4.

Feeding sequence—Packaging film

During the sequence, FIGURE 1B, the packaging film which overwraps the letters is fed by roller 30. The rate of feeding is approximately twice the travel of the pusher 6 in order to provide sufficient material to overwrap the top and bottom of the stack. It is measured out by a feed control which is described in FIGURE 2.

Chain 39 is connected to pusher 6 and turns shaft 40 when the pusher moves. Shaft 40 drives the input of magnetic clutch 42 and acts on its clutch part. The brake part is connected to shaft 41 which turns feed roller 30 by means of sprockets 43 and 45 and chain 44.

When pusher 6 is moved forward by air cylinder 7, the clutch is on and the brake is off. Therefore, the movement of the clutch turns roller 30, which feeds the packaging film during sequence, FIGURES 1A–1B.

Rollers 30 and 33, FIGURES 2 and 3, take the film from the dancer rollers, FIGURE 3, causing dancer arm 31 to rise. After a turn of about 30° arm 31 activates microswitch 32 which causes motor 15, FIGURE 6, to rotate causing rollers 13 and 14 to rotate and film roll 12 to deliver film, replenishing the dancer rollers until they have dropped to their original position. This de-activates microswitch 32 and motor 15 and stops film roll 12. Microswitch 32 is preferably adjustable in position.

Sliding table

During the wrapping procedure, the position of the sliding table T, see FIGURES 4 and 7, is changed.

From sequence, FIGURE 1A, to sequence FIGURE 1B, the sliding table was in a position which provided a bridge between the loading table and the table just behind the end sealer B, FIGURES 1 and 8. This bridge provides a smooth area for the letters to travel over the irregularities created by the elements of the lower end sealer. At sequence FIGURE 1D, the table begins to move away from its normal position and finishes this movement before sequence FIGURE 1E is finished. In this position the sliding table does not offer any obstruction to the action of the elements of both end sealers during the sealing and cutting operations. It returns to its normal position over the lower end sealer after the seal has been made.

Figure 10:
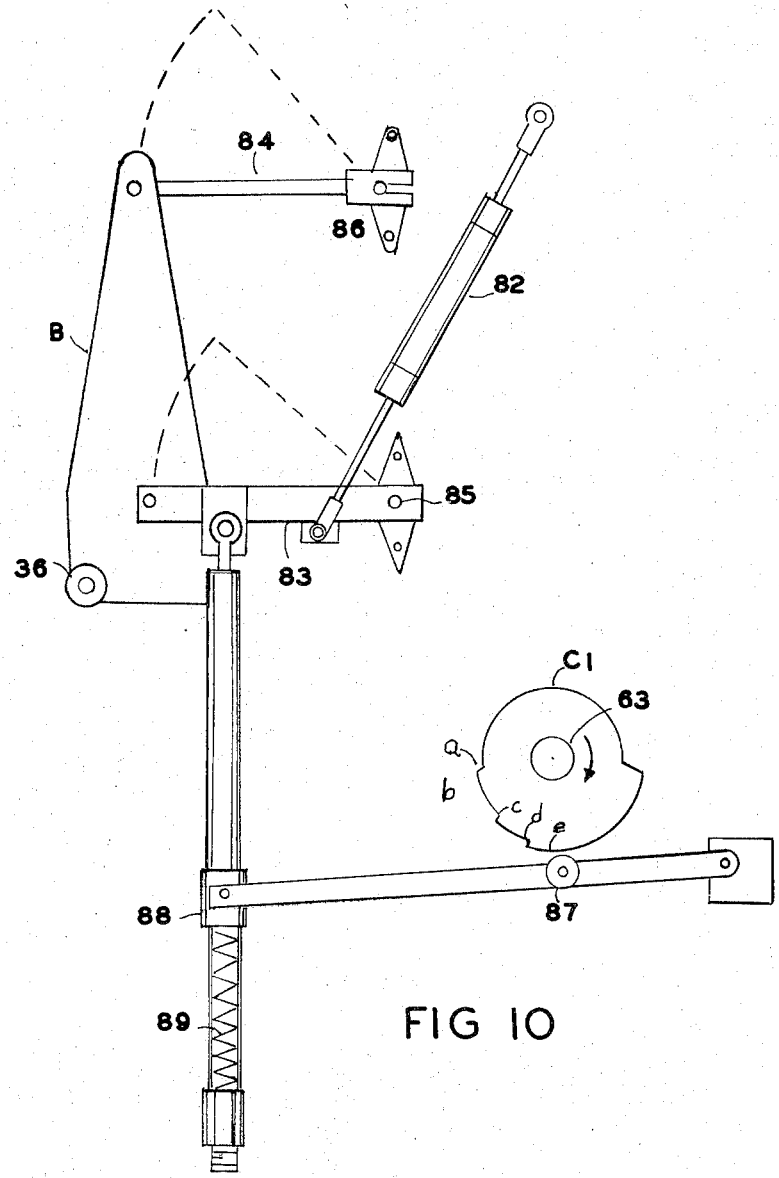
FIGURE 10 is a diagram illustrating the operation of the upper end sealer.

Action of the upper end sealer during this process is controlled by cam C1 of main shaft 63, FIGURE 10. The table motion is controlled by cam C6, FIGURES 4 and 7.

End sealer operation

The end sealer is now ready for action, FIGURE 8. While the upper end sealer B moves down, the cutter 67, the sealer bar 68 and the clamp 69 of the lower end sealer have moved up, FIGURE 8. Bar 68 is pressed against upper end sealer 72 by means of spring 75. Bar 68 is pressed against upper end sealer 71 by a similar spring. Upper end sealer 71 reacts against this pressure by its own weight and springs 138 which can be regulated by cap 139.

The action of the end sealer, which is controlled by cams of cam shaft 63, FIGURE 4, begins by raising cutting wire 190. The cutting wire is heated electrically time, duration and voltage controlled by the first cycle timer. The heated wire cuts through the two layers of film between the end sealers which are supported against the pressure of the wire by plastic member 70, FIGURE 8. This causes a perimeter type cut of seal, affixing the cut-off waste material.

After the cutting has taken place, the Nichrome ribbons 199, FIGURE 20, are heated as controlled by first cycle timer. The heating time can be adjusted by a timer T1 in the electrical cabinet and is in the neighborhood of ⅝ of a second. The heated ribbons heat seal the two films between them.

After the heating period, the sealer bars are moved away from the seals by means of the cam mechanism. The air from the blast tubes 207 and 208, FIGURE 8, cool the seal which is still hot. When this cooling period is finished, the upper end sealer is lifted up and the parts 67, 68, and 69 of the lower end sealer retract to their lower position.

The end seal has been made. The package is loose from the packaging film. It is now taken over by the transport mechanism which transfers it to the side sealer station.

*Transfer to side sealer station*

This transfer is accomplished as follows:

During the sequences of FIGURES 1A–1E the two carriages are in a position closest to the end sealer. The fingers F, F′ are initially retracted. After the loop has been accomplished, cylinders 128′ and one on the other side which are located just forward of the lower side sealer, underneath the table, move lever 128 into the position shown in FIGURES 14, 14A. This extends the fingers F, F′ into the loop formed by the film around the letters. After the fingers have taken this position, they are automatically locked by lever 135, FIGURE 14. The air cylinder 4 is controlled by microswitches on the first cycle timer T1.

This timer T1 then activates clutch 113, FIGURES 13A and 13B, causing chain 122 to turn clockwise and moving the finger carriage downstream from the end sealer.

The carriage moves until the finger strikes the end of the loop formed by the film. The carriage stops and clutch 113 which is under reduced voltage slips.

When the end seal has been made, the package has been cut off from the film, and the upper end sealer begins to lift, the voltage is increased on the clutch 113 by the first cycle timer T1. The package is free to move and the carriages are transferred towards the side seal stations by the chain 122 until the left hand transfer finger carriage hits a stop.

The locking levers 135 have been placed into the unlock position by means of cams 135′ properly located on the frame.

Air cylinders 5 outside the frame in the side sealer station move a bar which reverses the position of lever 128, thus retracting the fingers. This is controlled by the second cycle timer T2.

The timer T2 then de-energizes clutch 113 and activates clutch 114 which causes the chain 122 to drive the finger carriages back into their original position. The unit is now ready for the next feeding and overwrapping cycle.

*Main motor drive (FIGURE 4)*

Figure 5:
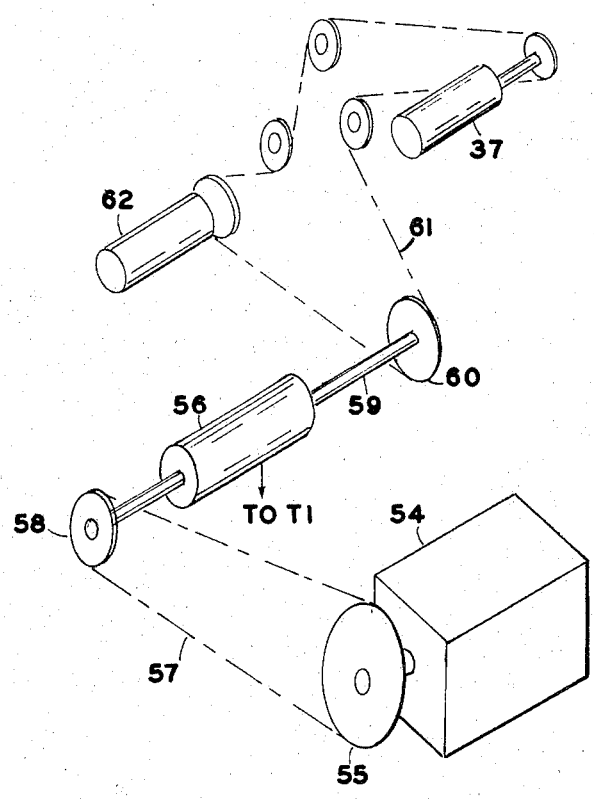
FIGURE 5 is a perspective view of the end sealer snubbing roller.

The main motor 47 is located under the fixed table between the end sealer and side sealers. It is attached to a variable speed drive 48. It carries a variable speed pulley 49 which drives shaft 50 by means of belt 51 and pulley 52. Shaft 50 drives a magnetic clutch brake 53 which drives a mechanical speed reducer 54. This speed reducer 54 has two output shafts, see FIGURE 5. One drives a sprocket 55 which drives magnetic clutch 56 by means of chain 57 and brake sprocket 58. Clutch brake 56 turns the packaging film drive roller 37 by means of shaft 59 and sprocket 60. Sprocket 60 drives chain 61 which runs over various sprockets and drives roller 37, FIGURE 3, and the trim-off removal shaft 62.

The second output shaft of the speed reducer 54, FIGURE 4, drives the main cam shaft 63 by means of gears 64 and 65. This cam shaft has five pairs of symmetrically arranged and otherwise equal cams C1, C2, C3, C4, and C5 and one central cam C6. Cams C1 and C5 operate the elements of the upper and lower end sealers, while C6 operates the sliding table T forward by means of cam follower 186 on lever 187, FIGURE 7. Spring 66 returns table T into its normal position. Cams C3, C4, and C5 operate the elements of the lower end sealer, FIGURE 8.

There are three moving elements in this sealer, the cutter 67, the Nichrome heat sealing ribbon holder 68 and the clamp 69. During the first wrapping operation, FIGURE 8, these elements are in their down position. Just before the sealing takes place, they are raised against the equivalent elements of the upper end sealer 70, 71 and 72. This movement is accomplished by the cams C3, C4 and C5. Cam C3 operates the cutter 67, cam C4 operates the heat seal ribbon holder 68 and cam C5 operates the clamp 69. For simplicity, only cam C5 is shown in FIGURE 8. The high part of cam C5 causes the clamp 69 to drop by means of cam follower 73 and adjustable link 74. The movement is reversed by spring 75 when the cam is in its lowest position.

Cam C2, FIGURE 9, lifts the heat seal ribbon holder 71 in the upper sealer. Cam follower 76 lifts shoe 77 by means of adjustable links 78 and rod 79. The return movement is accomplished by spring 80.

Cam C1, FIGURE 10, serves to lift and lower the upper end sealer B as a whole. The upper end sealer B is swung up into the position shown by dashed lines by means of spring 82. The links 83 and 84, one on each side of the machine, turn with the shafts 85 and 86.

The down movement is accomplished by cam C1, FIGURE 10, and follower 87 which acts on sliding ball bushing 88. Movement of the cam from $a$ to $b$ brings the upper sealer down to a nearly closed position, which allows the retraction of pusher 6 from under the sealer. From $b$ to $c$ the cam radius does not change and no movement of the end sealer takes place. From $c$ to $d$ the cam moves the end sealer further down until its rubber roller 36 comes into contact with snub roller 37, FIGURE 3. The last small increase in cam radius of the cam moves the cam follower 87 further. Since the upper end sealer B cannot follow this movement, cam follower 87 compresses spring 89 by means of sliding bushing 88. Spring 89 is adjustable and controls the clamping down force of B, FIGURE 10.

*Description of "end sealer" operation*

General Description: The end sealer consists of a movable upper portion and fixed lower portion. The upper portion end sealer moves up to allow the letters to pass through during the feeding and overwrapping operations and closes down onto the lower portion of the end sealer to finish this action and to make the heat seals and cut off. All movements of the end sealer are controlled by cam shaft 63, FIGURES 8, 9, and 10.

Figure 19:
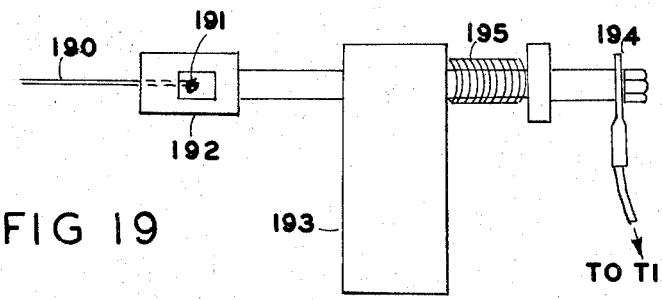
FIGURE 19 is a detail view of the cutting wire assembly.

(1) *Cutting wire.*—The cutting wire 190, FIGURES 8 and 19 has a knot 191 at its ends. This knot is inserted into the slotted wire holder 192 which can slide in plastic insulating block 193. The other end of the wire holder 192 has an electrical wire connection 194. Between the plastic insulating block 193 and electrical wire connection 194 is a spring 195 which keeps the cutting wire straight and takes up the increase in length of this wire when it expands under heat, FIGURE 19.

(2) *Insulating silicon rubber curtain.*—A curtain of thin silicon-glass fiber is wrapped around the sealing area in order to insulate the Nichrome ribbon from metallic parts of the sealer, and to prevent sticking of the ribbon from the film during the heat sealing operation.

Figure 21:
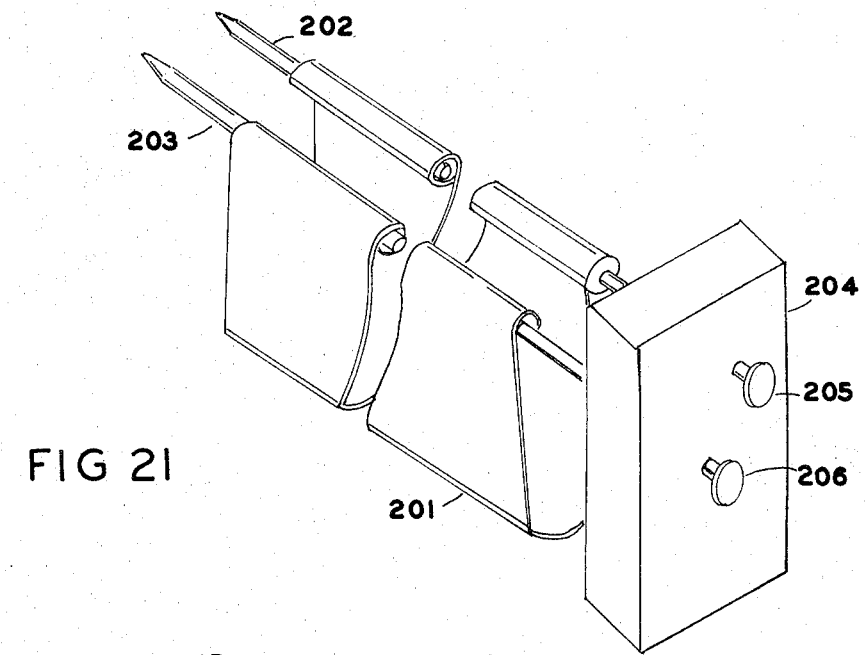
FIGURE 21 is a perspective view of the silicone rubber curtain for the sealers.

The curtain 201 is shown in FIGURES 20 and 21. Its ends are slipped over two rods 202 and 203 which are held by the rod holder 204 on one end, and bearings (not shown) on the other end. The rods penetrate through rod holder 204 and have knobs 205 and 206 at their ends. By means of these knobs, the operator can turn the curtain from one rod and onto the other thus shifting the part over the Nichrome ribbon 199, if the silicon rubber shows wear. Parts 201 and 204 form a unit which can be slipped out and in of the sealer for repair and replacement of the curtain.

Cycle timer drives (1) *Drive of first cycle timer, FIGURE 11.*—Cam shaft 63 drives a set of bevel gears 90 which drive the shaft 92 of timer T1 by means of the flexible coupling 91. This timer has adjustable cams 94 which operate microswitches 95.

(2) *Drive of second cycle timer, FIGURES 12 and 13A.*—The lower end of shaft 50 carries two sprockets. The sprocket 96 drives speed reducer 97 by means of chain 98 and sprocket 99. The output shaft 100 of the speed reducer drives timer T2 by means of flexible couplings 103. This timer has adjustable cams and microswitches, for timing the second cycle.

Drive of transfer mechanism, FIGURES 13A and 13B

The second sprocket 105 on shaft 50 drives shaft 106 by means of chain 107 and sprocket 108. Shaft 106 drives shaft 109 by means of a pair of bevel gears 110. Shaft 109 has two sprockets 111 and 112. One drives magnetic clutch brake 113, the other one magnetic clutch 114, FIGURE 13A.

The output shaft of both clutches carry meshing gears 115 and 116, FIGURE 13B. The output shaft of 114 carries sprocket 117. When one clutch is engaged, the other is not and vice versa; by engaging one or the other clutch the sprocket 117 changes the direction of its rotation. The part of this drive which has been described so far is in the lower part of the machine beneath the tables.

Chain 118 connects this system with the upper part of the drive, FIGURE 13B, which is located on both sides of the machine frame at the height of the table. Both sides are connected by shaft 119 which carries two sprockets 120 and 121. Sprocket 121 drives chain 122 over sprocket 123. Into this chain is inserted finger F carrier 124 by means of shock absorbing springs 125. The carrier slides over rods 126 and 127 by means of ball bearings. There is a corresponding carrier on the other side.

The finger carriage is shown in FIGURES 14 and 14A. Lever 128 turns shaft 129 and with it lever 130 which transfers its movement to finger 130 by means of connecting rod 132 and block 133. Moving lever 128 into the dashed position shown in FIGURE 14, retracts the finger into the dashed position shown in FIGURE 14A. Over center compression spring 134 keeps the finger in either extended or retracted position.

Lever 128 is actuated either by pneumatic cylinder 4 which is in the end sealer station or by cylinder 5 which is in the side sealer station.

The finger 131 is automatically locked in the extended position when locking lever 135 is in the position shown in FIGURE 14A. The lever 135 is placed into a no-locking position by means of cam 135' which is located at the frame of the machine in the side sealer station.

Figure 6:
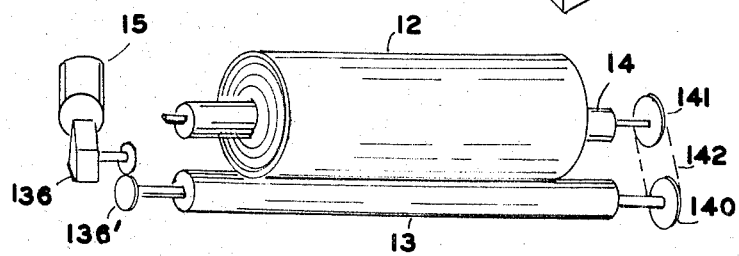
FIGURE 6 is a perspective view of the package film drive.

Motor drive of packaging film roll bed, FIGURE 6

Motor 15 is coupled directly to reduction gear 136. Its output shaft drives the rear bed roller 13 by a set of gears 136'. Roller 13 drives the forward bed roller 14 by means of sprockets 140 and 141 and chain 142.

Description of side sealers and their operating mechanism, FIGURES 16 and 22

There are four side sealers, a L.H. upper, a L.H. lower, a R.H. upper and a R.H. lower. All are basically alike with minor deviations from each other.

They consist of a frame 218, a clamp plate 212, a sealer bar 213, an air blast tube 214, a cutting wire assembly 215 (lower R.H. and L.H. side sealers only), a snub roller 216 which is spring loaded by spring 217, a mechanism to lift the sealer bar (in upper sealer only) here only partially shown 219.

FIGURES 18 and 23 show a schematic of the sealer bar which is identical for all four side sealers. Aluminum tube 213 is bolted to bar 221 which has cut-outs 222 and 223 for the silicon curtain 224 which is similar to the one used for the end sealer and described earlier. Rod 225 passes through tube 213 and extends on both ends. A system of nuts and pipe fittings close the tube 213 water tight with the help of O-rings and create a passage for cooling water shown by arrows, FIGURE 23.

The outer end of rod 225 serves as holder for the Nichrome heat sealing ribbons 226 which are insulated against the tube 213 by a silicon rubber strip 227. Spring 228 tensions the Nichrome ribbon 226 and takes up its elongation during heating. Brass block 229 holds the Nichrome ribbon in the same way as described earlier in connection with the end sealer. It also carries an electrical connection, not shown, for transfer of the electrical energy.

The sealer bar can slide up and down in guides which are attached to the frame. It can be lifted by an air cylinder which is located horizontally above rollers 216.

Also, referring to FIGURE 1, the upper sealer 213 is mounted on the upper portion 231 of the side sealer MS. The lower sealer bar 232 is mounted on the lower portion 233 of the side sealer member. The upper bar 213 is adapted to be squeezed against the lower bar 232 by means of scissor type linkage comprising the members 234, 235, 236, 236', and 237. The member 237 is pivotally mounted to the frame portion 231 at its upper end and is adapted to be actuated by the pneumatic cylinder 238 which is connected to be activated by the timer T2. The entire assembly MS may be made movable in the direction perpendicular to the axis of the long table and the whole assembly may be mounted on the rods 240 and 241. The entire assembly may be moved in towards the package by the pneumatic cylinder 242 which is also activated by the timer T2.

Side sealer snub roller drive (1) *R.H. side sealer, FIGURE 16.*—This assembly is located below the table on the R.H. side of the machine forward of the lower R.H. side sealer.

Air cylinder 161 when activated by timer T2, pulls spring loaded chain 162 towards itself. Doing this, it turns shaft 163 as shown by arrow, by means of the clutch 164 which allows the spring to return the position of the air cylinder without turning shaft 163 once the cylinder has been de-energized.

Shaft 163 turns sprocket 165 and then chain 166 and sprocket 167. Sprocket 168 is located on the output shaft of clutch brake 169. Sprocket 167 turns shaft 170 and with its sprocket 171 which turns sprocket 172 by means of chain 171'. Sprocket 172 is together with sprocket 173 on shaft 174 which turns in blocks 175. Block 175 is connected with block 177 by shaft 176 and encloses shaft 178 which is part of the snubbing rubber roller 179. This shaft is allowed to move up and down under the influence of the spring in spring capsule 180.

The whole arrangement has been made to transfer the indexing travel of air cylinder 161 into a measure rotation of snub roller 179 which moves up and down while the clutch 164 shaft is stationary.

The snubbing action is used to deposit trimmed-off film onto the removal chain, FIGURE 15.

Figure 17:
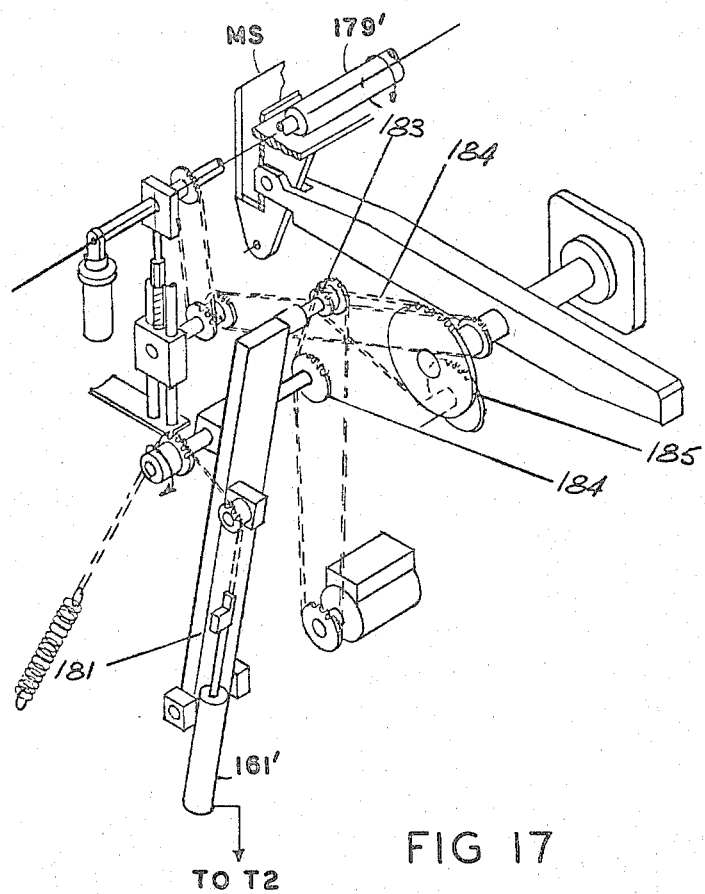
FIGURE 17 is a diagram of the left side sealer drive.

(2) *L.H. side sealer, FIGURE 17.*—This is basically the same drive with the one difference that parts 181 to 185 have been added to transfer the movement to the L.H. side sealer which is moving in and out during its operation if desired. The motion is provided by air cylinder 161'.

Side sealer waste material trim-off film drive, FIGURE 15

Trimmed-off film, cut off by the cutting wire, is fed outward by the snubbing rubber rollers 179 of the side sealers. The rollers, L.H. and R.H., deposit the trimmed-off film onto pins 144A which form spikes upon which the waste cut-off is affixed. Pins 144A are mounted on an endless loop around sprockets 144, 145, 146, and 147 which serves as take-up.

Sprocket 145 is driven by shaft 148 which is connected to the output of the magnetic clutch brake 149 which is connected to motor 150 by means of sprockets and chains 153, 151, and 152.

Mounted on the side sealer and above the chain is brush holder 154A with steel brushes 154. The brush holder is operated up and down by the air cylinder 155, by means of levers 156, 157, 158, and 159 and torque shafts 160 and 160'. Cylinder 155 is operated by timer T2.

When the trimmed-off piece of wrapping film has been deposited upon chain 143, the brushes are moved down and spike it onto the chain. During this operation, shaft 148 and chains 143 stand still because they have been disconnected from the constantly running motor 150 by clutch 149 which is operated by timer T2. After the brushes have been lifted by cylinder 155, the chains run again and the trimmed-off piece of film is wiped off the chain by deflector 144B and falls to the ground.

We claim:
1. Bundle wrapping means comprising,
means to feed a web of heat sealable wrapping material,
a bundle receiving platform,
means to feed and clamp said web in a first plane at a first work location,
means to push said bundle along an axis perpendicular to said plane against said web and completely past said first plane to form a loop of said wrapping material around said bundle,
means to heat seal the ends of said loop,
means to cut said loop from said web and reseal said web,
means to take up said web in a forward direction and clamp said web after the point where it has been resealed,
a table collapsible in a one plane at a second work location,
means to move said end sealed bundle along said axis onto said table,
first stationary side heat sealing means at said second work location,
second side sealing means at said second work location,
said second side sealing means being adapted to move perpendicular to said axis to collapse said table to permit snug side sealing of said bundle,
and means to eject said bundle from said second work location.

2. Apparatus as in claim 1 wherein said web and releasing means comprises,
means to clamp said web in a first plane,
a heater wire mounted parallel to said plane,
means to move said wire past said web plane,
holding means to restrain said web against movement of said wire, said holding means being recessed to accommodate movement of said wire, and means to apply a pulse of heating energy to said wire at the time it contacts said web.

3. Bundle wrapping means comprising,
means to feed a web of heat sealable wrapping material,
a bundle receiving platform,
a collapsible work table,
means to feed and clamp said web in a first plane at a first work location,
means to push said bundle along an axis approximately perpendicular to said plane against said web and completely past said first plane to form a loop of said wrapping material around said bundle,
means to heat seal the ends of said loop,
means to cut said loop from said web and reseal said web,
means to take up said web in a forward direction and clamp said web after the point where it has been resealed,
movable finger means to move said end sealed bundle to a second work location,
first stationary side heat sealing means at said second work location,
second side sealing means at said second work location,
said second side sealing means being adapted to move perpendicular to said axis to collapse said table to permit snug side sealing of said bundle,
motor means to move said second side sealing means sideways to accommodate different width bundles,
and means to eject said bundle from said second work location.

4. Bundle wrapping means comprising,
means to feed a web of heat sealable wrapping material,
a bundle receiving platform,
means to feed and clamp said web in a first plane at a first work location,
means to push said bundle along an axis perpendicular to said plane against said web and completely past said first plane to form a loop of said wrapping material around said bundle,
means to heat seal the ends of said loop,
means to cut said loop from said web and reseal said web,
means to take up said web in a forward direction and clamp said web after the point where it has been resealed,
means to move said end sealed bundle to a second work location,
side sealing means at said second work location,
said side sealing means being adapted to move perpendicular to said axis to permit snug side sealing of said bundle,
motor means to move said second side sealing means sideways to accommodate different width bundles,
and means to eject said bundle from said second work location.

5. Bundle wrapping means comprising,
means to feed a web of heat sealable wrapping material,
a bundle receiving platform,
means to feed and clamp said web in a first plane at a first work location,
means to push said bundle along an axis perpendicular to said plane against said web and completely past said first plane to form a loop of said wrapping material around said bundle,
means to heat seal the ends of said loop,
means to cut said loop from said web and reseal said web,
means to take up said web in a forward direction and clamp said web after the point where it has been resealed,
means to move said end sealed bundle to a second work location,
side sealing means at said second work location,
said side sealing means being adapted to move perpendicular to said axis to permit snug side sealing of said bundle,
motor means to move said second side sealing means sideways to accommodate different width bundles,
means to eject said bundle from said second work location,
means to trim any excess wrapping material along the sides of said bundle,
and means to remove said excess material.

6. Bundle wrapping means comprising,
means to feed a web of heat sealable wrapping material,
a bundle receiving platform,
means to feed and clamp said web in a first plane at a first work location,
means to push said bundle along an axis perpendicular to said plane against said web and completely past said first plane to form a loop of said wrapping material around said bundle, means to heat seal the ends of said loop, means to cut said loop from said web and reseal said web, means to take up said web in a forward direction and clamp said web after the point where it has been resealed, a table collapsible in a one plane at a second work location, means to move said end sealed bundle along said axis onto said table, first stationary side heat sealing means at said second work location, second side sealing means at said second work location, said second side sealing means being adapted to move perpendicular to said axis to collapse said table to permit snug side sealing of said bundle, means to eject said bundle from said second work location, said sealing means including liquid cooling means adapted to cool said sealing means and valved compressed air cooling means adapted to cool the seal on the bundle.

7. Bundle wrapping means comprising, means to feed a web of heat sealable wrapping material, a bundle receiving platform, means to feed and clamp said web in a first plane at a first work location, means to push said bundle along an axis approximately perpendicular to said plane against said web and completely past said first plane to form a loop of said wrapping material around said bundle, means to heat seal the ends of said loop, means to cut said loop from said web and reseal said web, means to take up said web in a forward direction and clamp said web after the point where it has been resealed, means to move said end sealed bundle to a second work location, movable means at said second work location to seal the sides of said bundle, and motor means connected to move said movable means sideways.

8. Bundle wrapping means comprising, means to feed a web of heat sealable wrapping material, a bundle receiving platform, means to feed and clamp said web in a first plane at a first work location, means to push said bundle along an axis perpendicular to said plane against said web and completely past said first plane to form a loop of said wrapping material around said bundle, means to heat seal the ends of said loop, means to cut said loop from said web and reseal said web, means to take up said web in a forward direction and clamp said web after the point where it has been resealed, means to move said end sealed bundle to a second work location, movable side sealing means at said second work location, motor means connected to move said movable means sideways, and means connected to said side sealing means to trim off and remove excess wrapping material.

9. Bundle wrapping means comprising, means to feed a web of heat sealable wrapping material, a bundle receiving platform, means to feed and clamp said web in a first plane at a first work location, means to push said bundle along an axis perpendicular to said plane against said web and completely past said first plane to form a loop of said wrapping material around said bundle, means to heat seal the ends of said loop, means to cut said loop from said web and reseal said web, means to take up said web in a forward direction and clamp said web after the point where it has been resealed, means to move said end sealed bundle to a second work location, side sealing means at said second work location, said side sealing means being adapted to move perpendicular to said axis to permit snug side sealing of said bundle, motor means connected to move said movable means sideways.

and control means to operate said web feeding means, said end sealing means and said side sealing means in a predetermined sequence.

References Cited

UNITED STATES PATENTS

| | | | |
|---|---|---|---|
| 2,696,702 | 12/1954 | Martin | 53—230 |
| 3,060,658 | 10/1962 | Horsting | 53—120 |
| 3,158,973 | 12/1964 | Monaghan | 53—66 |
| 3,164,937 | 1/1965 | Ingram | 53—229 |
| 3,191,356 | 6/1965 | Zelnick et al. | |

FOREIGN PATENTS

| | | |
|---|---|---|
| 1,249,181 | 11/1960 | France. |
| 1,327,434 | 4/1963 | France. |

TRAVIS S. McGEHEE, *Primary Examiner.*

N. ABRAMS, *Assistant Examiner.*